United States Patent

Pier

[11] 4,042,081
[45] Aug. 16, 1977

[54] MANUAL CONTROL OF THIRD RAIL POWER KNOCKOUT

[75] Inventor: Jerome R. Pier, Bonita, Calif.

[73] Assignee: Westinghouse Air Brake Company, Wilmerding, Pa.

[21] Appl. No.: 625,482

[22] Filed: Oct. 24, 1975

[51] Int. Cl.² .............. B60L 3/04; B60L 5/38
[52] U.S. Cl. .............................. 191/8; 191/49
[58] Field of Search ........... 191/8, 49, 68, 78, 85, 191/86, 88, 91, 60.2, 60.3, 60.4, 57, 58, 59.1; 200/61.08

[56] References Cited

U.S. PATENT DOCUMENTS

| | | | |
|---|---|---|---|
| 1,020,794 | 3/1912 | Bluhm | 191/49 |
| 2,117,028 | 5/1938 | Larsson | 191/85 |
| 2,892,904 | 6/1959 | Sierk | 191/49 |
| 3,740,498 | 6/1973 | Herbert | 191/49 |

Primary Examiner—Trygve M. Blix
Assistant Examiner—Reinhard J. Eisenzopf
Attorney, Agent, or Firm—W. F. Poore; R. W. McIntire, Jr.

[57] ABSTRACT

Manual closure of a switch in a power-supply circuit to an explosive type bolt causes detonation of the bolt which releases a caged spring that thereupon is rendered effective to rock a lever in the direction to lift a current-collecting shoe out of engagement with the surface of a power-supply third rail thereby causing power knockout to the driving motors of an electrically propelled vehicle.

6 Claims, 1 Drawing Figure

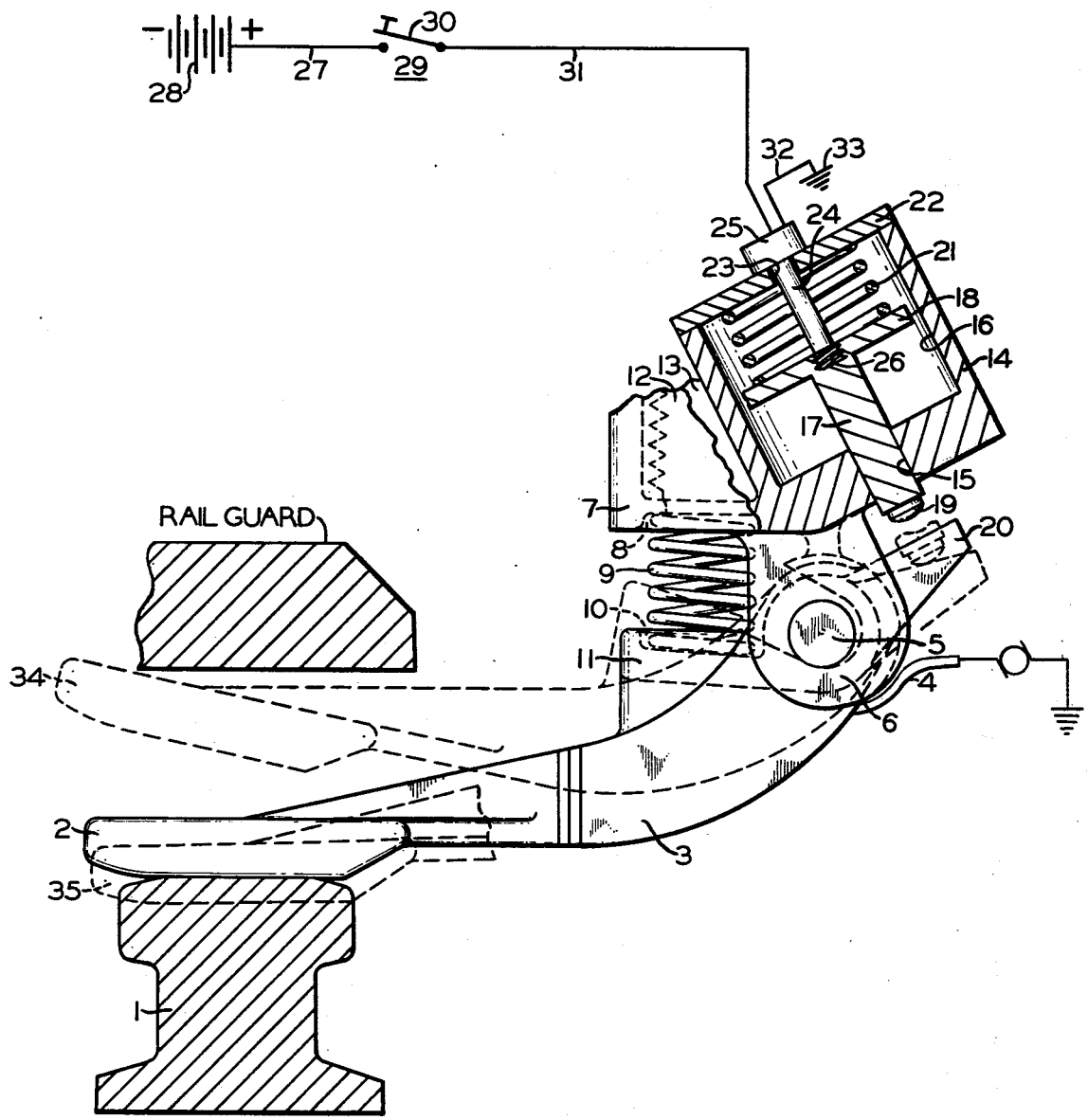

MANUAL CONTROL OF THIRD RAIL POWER KNOCKOUT

BACKGROUND OF THE INVENTION

Although circuit breakers have heretofore been provided in the power supply circuit extending between a third rail and the driving motors of electrically propelled rail vehicles, a number of serious fires have occurred on such vehicles as the result of arcing upon operation of the circuit breakers, not removing the current-collecting shoe from contact with the surface of the third rail, and the occurrence of short circuits. Therefore, it would be most desirable that, should a fire, or the possibility of a fire, occur on board an electrically propelled vehicle, the operator of the vehicle be provided with manually-controlled means for effecting lifting of the current-collecting shoe out of engagement with the surface of the third rail thereby isolating the vehicle from its source of power.

Accordingly, it is the general purpose of this invention to provide a manually-controlled spring-actuated linkage or mechanism for, at the discretion of an operator, effecting lifting of a current-collecting shoe out of contact with the surface of a third rail supplying power into an electrically propelled vehicle.

SUMMARY OF THE INVENTION

According to the present invention, an explosive-type bolt normally maintains a spring compressed which, when released in response to manual closing of a denotation circuit for the bolt, effects rocking of a pivoted lever to lift a current-collecting shoe carried at one end of the lever out of engagement with the surface of a third rail that supplies current to the power-supply circuit of the driving motors of an electrically propelled vehicle.

In the accompanying drawing:

The single FIGURE is an elevational view, partly in cross-section, of a manually-controlled spring-actuated mechanism for effecting lifting of a current-collecting shoe out of engagement with the surface of a third rail.

Referring to the drawing, electrical power is supplied to the driving motors of an electrically propelled vehicle from a third rail 1 via a circuit that includes a current-collecting shoe 2 that is formed integral with the left-hand end of a lever 3 to which is connected one end of an electrical flexible cable 4 the opposite end of which is connected to the driving motors (not shown) of the vehicle.

Intermediate its ends the lever 3 is pivotally mounted on a pin 5 that constitutes a fulcrum for this lever. The opposite ends of the pin 5 are carried in and suitably insulated from the jaws of a clevis 6 that is formed integral with the bottom of a supporting bracket 7 that is secured to a suitable part of a truck frame (not shown) of the vehicle.

A shallow depression 8 formed in the bottom of the supporting bracket 7 constitutes a spring seat for one end of a spring 9 the opposite end of which abuts a shallow depression 10 provided in a boss 11 that is formed integral with the lever 3. This spring 9 is normally effective to bias the lever 3 in a counterclockwise direction about the pin 5 so that the current-collecting shoe 2 is pressed into contact with the top surface of the third rail 1.

One end of each of two parallel spaced-apart webs 12 and 13 is integral with the supporting bracket 7 and the opposite end of each of these webs is integral with a cylinder 14 that is provided with a bore 15 and a coaxial counterbore 16.

Extending through the bore 15 with a running fit is a rod 17 the upper end of which is integral with an outturned flange 18. The lower end of the rod 17 has secured thereto by any suitable means (not shown) an insulating means 19 in the form of a plastic insert which may be, for example, made of nylon material. This nylon insert 19 serves to insulate the rod 17 from an arm 20 that is integral with the lever 3 and is disposed on the right-hand side of the pin 5, as viewed in the drawing, when the rod 17 is moved downward from the position shown by a spring 21 which is heavier than the spring 9.

As shown in the drawing, the spring 21 is interposed between the flange 18 and a cover member 22 that closes the open end of the counterbore 16 and is secured to the cylinder 14 by any suitable means (not shown).

The cover member 22 is provided with a bore 23 through which extends an explosive-type bolt 24 having a head 25 that abuts the outside surface of this cover member 22. The lower end of the explosive-type bolt 24 is provided with external screw threads that have screw-threaded engagement with internal screw threads provided in a bottomed bore 26 extending inward from the top surface of the flange 18. Thus, the explosive-type bolt 24 normally retains the flange 18 and rod 17 in the position shown in the drawing in which the spring 21 is compressed or caged between this flange 18 and the cover member 22.

The explosive-type bolt 24 may be purchased as a commercial item and is denoted by energizing an electrical circuit which will now be described.

One end of a wire 27 is connected to a source of electrical power which may be, for example, the positive terminal of a storage battery 28, and the opposite end is connected to one terminal of a manually-operable switch 29 that has a movable contact 30.

Connected to the other terminal of the switch 29 is one end of a wire 31 that has its opposite end connected to the head 25 of the explosive bolt 24. The circuit for the explosive-type bolt 24 further includes a third wire 32 that at one end is connected to the head 25 of this bolt 24 and at its opposite end is connected to ground which is indicated in the drawing by the reference numeral 33.

It will be understood that the explosive-type bolt 32 is so constructed that this bolt 32 and the switch 29, when its contact 30 is closed, are disposed in series in the above-described circuit which extends from the positive to the negative terminal of the battery 28 via the wires 27, 31, 32 and ground connection 33.

OPERATION

Let it be assumed that an electrically-propelled vehicle that receives power for operating its driving motors from the third rail 1 is provided with the apparatus shown in the drawing. Therefore, the spring 9 is normally effective to bias the current-collecting shoe 2 into circuit-closing contact with the top surface of the third rail 1 in order that electrical current may flow from this third rail 1 to the driving motors via the current-collecting shoe 2, lever 3 and cable 4.

It may be assumed that the switch 29 is encased in a switch box having a glass cover which must be broken in order to gain access to the movable contact 30 of this switch 29, it being understood that this switch box is located within easy reach of the engineer or operator of the electrically-propelled vehicle or train of electrically-propelled vehicles.

Now should a fire or some other catastrophe occur on board the electrically-propelled vehicle that might result in the starting of a fire, so that it would be most imperative that electrical power no longer be supplied from the third rail 1 to the power-supply circuit for the driving motors of the vehicle, the engineer or operator will immediately break the glass cover on the switch box encasing the switch 29 and thereafter manually close the movable contact 30 of this switch 29.

Upon closing the contact 30 of the switch 29, current will flow from the positive terminal of the battery 28 to the ground connection 33 via wire 27, contact 30 of switch 29, wire 31, explosive-type bolt 24 and wire 32.

When current is thus supplied from the battery 28 through the explosive-type bolt 24, it will cause this bolt to explode and disintegrate.

It is apparent from the drawing that when the explosive-type bolt 24 disintegrates, it releases the caged spring 21 whereupon this spring is rendered effective to shift the flange 18, rod 17 and plastic insert 19 downward toward the right, as viewed in the drawing, until the plastic insert 19 abuts the upper side of the arm 20 of the lever 3. Thereafter, the spring 21, which is heavier than the spring 9, transmits a force to the arm 20 of the lever 3, via the flange 18, rod 17 and plastic insert 19, which force, as the spring 21 expands, effects clockwise rocking of the lever 3 about the fulcrum pin 5 so that the current-collecting shoe 2 carried on the lefthand end of the lever 3 is lifted upward out of circuit-closing contact with the top surface of the third rail 1.

When the current-collecting shoe 2 is thus lifted upward out of circuit-closing contact with the top surface of the third rail 1, electrical current can no longer flow from this third rail 1 to the power-supply circuit for the driving motors of the electrically-propelled vehicle. Therefore, electrical current from the third rail 1 can no longer flow to any part or circuit on the vehicle to cause or assist in the starting, spread or propagation of a fire on the vehicle.

After the vehicle has been returned to a repair shop for repairs, in order to replace the previously denoted explosive-type bolt 24 with a new explosive bolt, a workman will first remove the cover member 22 from the cylinder 14 and thereafter take out spring 21 and extract the remains, if any, of the previously denoted explosive-type bolt 24 from the bottomed bore 26 in the flange 18.

Next, the workman will rock the current-collecting shoe 2 and lever 3 counterclockwise about the pin 5 from the position indicated in dotted lines and denoted by the reference numeral 34 to the position of the shoe 2 and lever 3 indicated in dotted lines and denoted by the reference numeral 35, it being understood that the lever 3 must be rocked to this position in order to effect shifting of the insert 19, rod 17 and flange 18 upward toward the left, as viewed in the drawing, to the position shown.

After the flange 18, rod 17 and insert 19 have been returned to the position shown, the workman will insert a new explosive-type bolt 24 through the bore 23 in the cover 20 and through the spring 21. Thereafter, he will rotate the new bolt 24 to cause the screw threads on the lower end thereof to engage the internal screw threads in the bottomed bore 26 in flange 18, it being apparent that, as the new bolt 24 is thus rotated, the spring 21 is compressed between the cover member 22 and the flange 18.

The cover member 22 may now be secured to the cylinder 14 after which the wires 31 and 32 are connected to the head 25 of the new explosive-type bolt 24.

The apparatus shown in the drawing is now ready for operation.

It is well-known that in the construction of a third rail, gaps of substantial length are provided between the adjacent ends of each two sections of the third rail. Consequently, as the current-collecting shoe 2 passes off the end of one section of rail, the spring 9 will effect counterclockwise rocking of this current-collecting shoe 2 and the lever 3 to the position indicated by the reference numeral 35. It will be understood that when the current-collecting shoe 2 and lever 3 are rocked counterclockwise by the spring 9 to the position indicated in the drawing by the reference numeral 35, the upper side of the arm 20 of lever 3 will abut the plastic insert 19, it being remembered that the spring 21 is stronger than the spring 9. Thus, the strength of the spring 21 determines the position the current-collecting shoe 2 and lever 3 occupy when this shoe 2 is not in contact with the top surface of the third rail 1.

It is apparent from the drawing that, while the current-collecting shoe 2 occupies the position indicated by the reference numeral 35, the bottom surface of this shoe 2 is only a short distance below the top surface of the third rail 1.

Since the ends of each section of a third rail are curved downward so that the end is slightly below the bottom surface of the current-collecting shoe 2, it is apparent that when the repaired electrically-propelled vehicle is hauled from the repair shop, by such as a switch engine, to a track provided with a third rail, the bottom surface of the current-collectng shoe 2 will ride up the curved surface on the end of the first section of the third rail and onto the top surface of this rail. Thereafter, current can flow from the third rail to the driving motors of this electrically propelled vehicle via the current-collecting shoe 2, lever 3 and the cable 4 for effecting propulsion of this vehicle subsequent to uncoupling the switch engine therefrom.

If two or more electrically-propelled vehicles, each provided with the apparatus shown in the drawing, are coupled together to form a train that is controlled by an engineer or operator on the first vehicle, the explosive-type bolt 24 on each of the vehicles may be connected by wires that extend through the several vehicles that comprise the train to the wire 31 on the leading or first vehicle in the train. Accordingly, it is apparent that when the contact 30 of the switch 29 on the leading vehicle is closed, upon the occurrence of a fire or other catastrophe on board the train, the explosive-type bolt 24 on each vehicle will be detonated whereupon the spring 21 on the respective vehicle will be rendered effective to lift the current-collecting shoe 2 of the respective vehicle out of circuit-closing contact with the top surface of the third rail 1.

Having now described the invention what I claim as new and desire to secure by Letters Patent, is:

1. Power knockout apparatus for disposition in a power-supply circuit extending from a third rail power supply to at least one electrically-operated prime mover of an electrically-propelled vehicle, said power knockout apparatus comprising in combination with the third rail and the power-supply circuit:

a. current-collecting means for current-collecting engagement with the third rail,
b. a fulcrum member,
c. a lever pivoted intermediate its ends on and in insulated relation with said fulcrum member, said lever carrying said current-collecting means at one end thereof and having an electrical connection with the power supply circuit for the at least one electrically-operated prime mover,
d. biasing means for transmitting a force to said lever to cause rocking thereof about said fulcrum member in one direction to force said current-collecting means into current-collecting engagement with the third rail,
e. means for causing rocking of said lever in a direction opposite said one direction to effect the lifting of said current-collecting means out of current-collecting engagement with the third rail,
f. potentially-explosive means normally effective to render said means ineffective to rock said lever in the direction opposite said one direction, and
g. manually-controlled electrically-operated means for effecting the explosion of said potentially-explosive means whereupon said rocking means is rendered effective to rock said lever in the direction to lift the current-collecting means out of current-collecting engagement with the third rail.

2. Power knockout apparatus, as recited in claim 1, further characterized in that said means for causing rocking of said lever in a direction opposite said one direction comprises:
a. a caged spring,
and said potentially-explosive means is normally effective to cage said spring until exploded in response to manual operation of said manually-controlled electrically-operated means whereupon said spring effects rocking of said lever in the direction to lift the current-collecting means out of current collecting engagement with the third rail.

3. Power knockout apparatus, as recited in claim 2, further characterized in that said potentially-explosive means for effecting a release of said caged spring comprises an explosive bolt for retaining said spring caged prior to the explosion thereof.

4. Power knockout apparatus, as recited in claim 3, further characterized by an electrical power-supply circuit for said explosive bolt, and a manually-operated switch disposed in said circuit for controlling the supply of electrical power to said explosive bolt to effect the detonation thereof.

5. Power knockout apparatus, as recited in claim 2, further characterized by said means enabling said spring, when released, to transmit a force to said lever, said means comprising,
a. a pair of spring seats for said spring, one of said seats being immovable,
b. an operating rod integral at one end with the other one of said pair of spring seats, the other end of said operating rod being shiftable by said spring into contact with said lever to effect the rocking thereof in the direction opposite said one direction, and
c. insulating means carried in said other end of said operating rod to insulate said rod from said lever.

6. Power knockout apparatus, as recited in claim 1, further characterized by an electrical power-supply circuit for supplying electrical power to said electrically-operated means, and manual means for controlling the supply of electrical power to said circuit.

* * * * *